C. HAAS.
HEATING APPLIANCE FOR GLASS MOLDS.
APPLICATION FILED JAN. 29, 1917.
1,248,483. Patented Dec. 4, 1917.
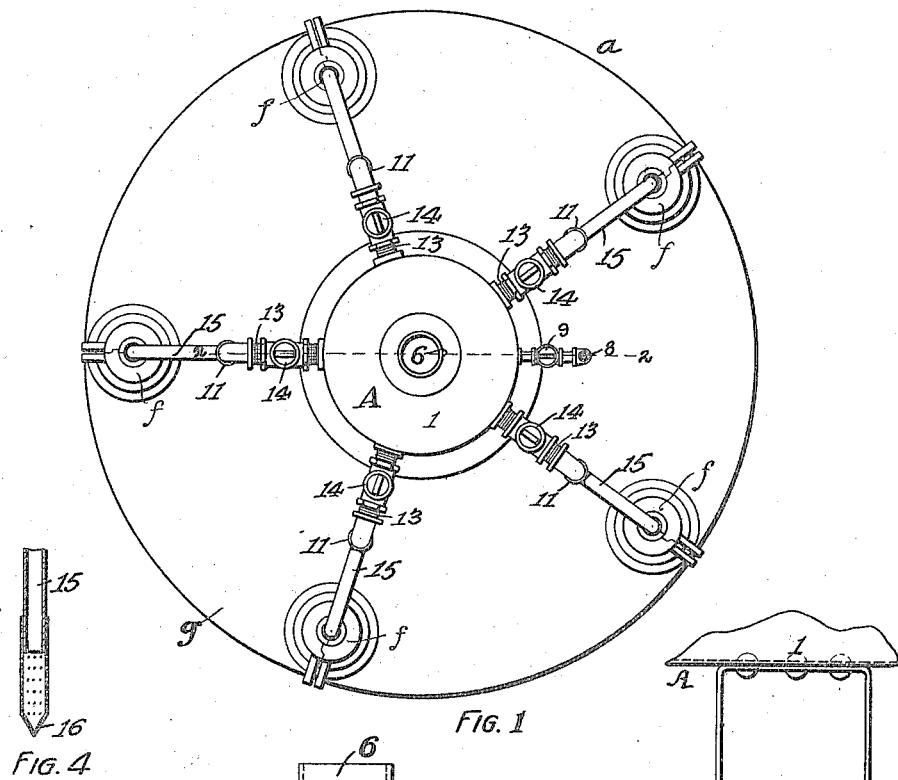
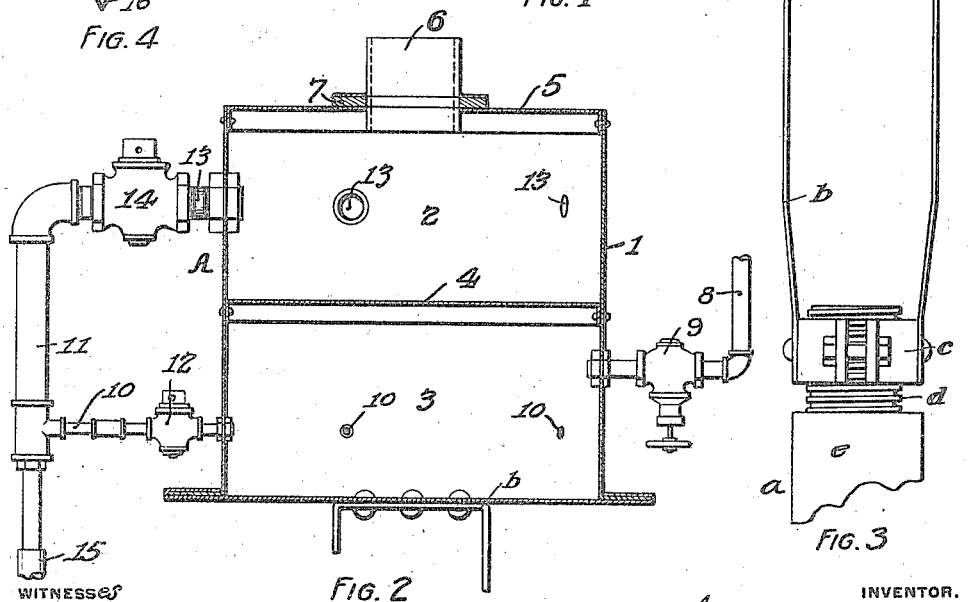
WITNESSES
INVENTOR.
Carl Haas,

UNITED STATES PATENT OFFICE.

CARL HAAS, OF PITTSBURGH, PENNSYLVANIA, ASSIGNOR TO PITTSBURGH CORNICE & ROOFING COMPANY, OF PITTSBURGH, PENNSYLVANIA, A CORPORATION OF PENNSYLVANIA.

HEATING APPLIANCE FOR GLASS-MOLDS.

1,248,483. Specification of Letters Patent. Patented Dec. 4, 1917.

Application filed January 29, 1917. Serial No. 145,067.

*To all whom it may concern:*

Be it known that I, CARL HAAS, a citizen of the United States, and resident of Pittsburgh, in the county of Allegheny and State of Pennsylvania, have invented a new and useful Improvement in Heating Appliances for Glass-Molds; and I do hereby declare the following to be a full, clear, and exact description thereof.

My invention relates to mold heating appliances, and has special reference to such heating devices for being used in connection with glass bottle molds or semi-automatic or other machines.

In the manufacture of bottles and other articles in the usual molds, and more particularly when such molds are on machines in numbers, such molds will become cold when the machines are stopped for making repairs, spells for meals of the men, and for other purposes, so that when the molds are again used considerable time is taken to warm up such molds by the hot molten glass, thereby resulting in considerable loss of time and material in the making of such articles.

The object of my invention is to produce a cheap, simple and efficient mold heating appliance, which may be supported on or adjacent to the machine and which will enable the molds on such machine to be kept warm when the molds are not being used in glass making, as well as such an appliance which can be easily and quickly operated at will for the purpose for which it is intended, and will enable the desired heat to be applied to the molds, so that they will be ready for the making of glass articles therein when desired.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved mold heating appliance, I will describe the same more fully, referring to the accompanying drawing, in which—

Figure 1 is a top plan view of my improved mold heating appliance, showing the same in position for heating of glass molds placed on the table of a machine. Fig. 2 is an enlarged cross-section of the appliance on the line 2—2 of Fig. 1. Fig. 3 is a detail view showing the manner of attaching the appliance to the column of an ordinary glass machine. Fig. 4 is a detail view of the burner and its connection.

Like symbols of reference herein indicate like parts in each of the figures of the drawing.

As illustrated in the drawing my improved mold heating appliance is shown at A, and comprises the storage tank 1, which is provided with the air tight compartments 2 and 3 therein. These compartments 2 and 3 are formed in the upper and lower portions of the tank 1 and are for storing the air and gas, respectively, therein such compartments being separated by the partition 4 within the tank and between the compartments. Leading into the upper compartment 2, through the cover 5 of the tank 1, is the air supply pipe 6, which provides for a blast of air from a suitable means, such as a fan (not shown) and which blast is controlled by a blast gate 7 connected to the pipe 6 adjacent to said cover. Leading through one side of the tank 1 into the compartment 3 is the gas line 8, which leads from a suitable source of supply and is provided with a valve 9 therein, and leading from said compartment and through the side of said tank and around the same are a series of gas pipes 10, each of which connect with a supply pipe 11 and such pipes 10 are each provided with a suitable regulating valve 12 therein. Leading from the compartment 2, through the side of the tank 1, and around the same are a series of air pipes 13, which are in a vertical line with the pipes 10, and are each provided with a regulating valve 14 therein, and each of these pipes 13 connect with each one of the supply pipes or manifolds 11. Connected to each of the supply pipes 11 is one end of a hose or other flexible connection 15, which has its opposite end provided with a suitable burner, such as the perforated pipe connection 16.

In the use of my improved mold heating appliance A in connection with the usual semi-automatic or other glass molding machines, such as the machine *a*, the appliance A can be supported above the machine by means of a bracket *b* connected to the bottom of the tank 1, and such bracket having a collar *c* at its lower end secured around the threaded portion d on the upper end of the column e of the machine.

The machine a has the usual glass molds positioned in the usual manner on the table g, which is rotatable around the lower end of the column e, so that when it is desired to heat such molds, the burners 16 on the end of the hose connections 15 are placed in each of the molds and, with the gate 7 and valve 9 open, the air and gas from the pipes 6 and 8 enters the compartments 2 and 3 to form the products of combustion so that they will enter the supply pipes or manifolds 11, through the valves 14 and 12 and pipes 10 and 13. The air and gas entering such pipes 11 will pass down through the same and through the hose connections 15 and burners 16, where they are lighted in any suitable manner, and thereby allow the flame and heat therefrom to heat such molds. After the molds f are heated as desired, and it is desired to use the same, the gate 7 and valve 9 are closed which will close off the air and gas entering the compartments 2 and 3, pipes 10, 13 and 11, hose 15 and burner 16, so that the burner can then be lifted out of the molds f and be ready for the repeating of the heating operations of said molds.

It will be evident that my improved heating appliance for glass molds may be used detached from the glass molding machine, while air from a compressor can be used in place of the fan air, and various other modifications and changes in the design, construction and application of the device may be resorted to, without departing from the spirit of the invention or sacrificing any of its advantages.

It will thus be seen that my improved glass mold heating appliance will enable the molds to be kept warm when the operations of making glass articles therein are temporarily suspended, and thereby overcome the loss of glass and time incident to the proper heating of the molds for forming perfect articles, while practical experience with the device has demonstrated a saving of between one-half and one gross of glass bottles by having the molds with the proper heat when they start to operate the same. The device is always in position and ready to handle and will not be liable to get out of order and when the heater is installed and the valves leading to the supply pipe are regulated to the correct position to obtain proper combustion, such valves will never need to be changed or, in other words, they will always remain in the same position so that all that is necessary is to operate the blast gate and the gas inlet valve to permit the air and gas compartments in the tank to be filled. This is a very important part in the operation of the device as the cost of time in regulating the valves for proper combustion at each time of lighting the burners is entirely eliminated.

What I claim as my invention and desire to secure by Letters Patent is—

1. The combination with a mold heating appliance of a glass molding machine, of a tank having a partition within the same for forming a gas storage compartment on one side of the same and an air storage compartment on the other side of the same, a gas line leading into said gas compartment, an air line leading into the air compartment for supplying air under pressure therein, pipes leading from each of said compartments and provided with a regulating valve therein, a common manifold connecting with said two last named pipes, and a burner connected to said common manifold by a flexible connection.

2. In a mold heating appliance having a glass molding machine, a tank having a centrally spaced partition therein for forming a gas storage compartment on one side of the same, and an air storage compartment on the other side of the same, a gas line leading into said gas compartment, an air line leading into said air compartment for supplying air under pressure, regulating valves in said gas line and said air line, independent outlet pipes connected with each of said chambers, said air outlet pipe being of greater diameter than said gas outlet pipe, a common manifold connected with said outlet pipes, regulating valves in said outlet pipes between said tank and said manifold, and a burner connected to said common manifold by a flexible connection substantially as described.

In testimony whereof I, the said CARL HAAS, have hereunto set my hand.

CARL HAAS.

Witnesses:
J. N. COOKE,
A. D. P. MILLER.

Copies of this patent may be obtained for five cents each, by addressing the "Commissioner of Patents, Washington, D. C."